United States Patent
Thomson

(10) Patent No.: US 9,266,683 B1
(45) Date of Patent: Feb. 23, 2016

(54) SINGLE MOTOR TWO MASS BI-DIRECTIONAL CONVEYOR

(71) Applicant: Thomas Thomson, Woodstock, IL (US)

(72) Inventor: Thomas Thomson, Woodstock, IL (US)

( * ) Notice: Subject to any disclaimer, the term of this patent is extended or adjusted under 35 U.S.C. 154(b) by 0 days.

(21) Appl. No.: 14/736,370

(22) Filed: Jun. 11, 2015

(51) Int. Cl.
*B65G 27/32* (2006.01)
*B65G 27/20* (2006.01)
*B65G 27/08* (2006.01)
*B65G 27/04* (2006.01)

(52) U.S. Cl.
CPC ........... *B65G 27/20* (2013.01); *B65G 27/04* (2013.01); *B65G 27/08* (2013.01)

(58) Field of Classification Search
CPC ........ B65G 27/20; B65G 27/32; B06B 1/161; B06B 1/166
USPC .............................. 198/752.1, 753, 758–769
See application file for complete search history.

(56) References Cited

U.S. PATENT DOCUMENTS

| | | | |
|---|---|---|---|
| 3,068,996 A | 6/1961 | Musschoot | |
| 3,216,557 A * | 11/1965 | Morris | B65B 1/08 198/751 |
| 3,746,149 A | 7/1973 | Schrader | |
| 5,713,457 A * | 2/1998 | Musschoot | B65G 27/30 198/753 |
| 5,934,446 A | 8/1999 | Thomson | |
| 6,029,796 A | 2/2000 | Musschoot | |
| 6,705,459 B1 * | 3/2004 | Musschoot | B65G 27/08 198/763 |

* cited by examiner

*Primary Examiner* — James R Bidwell
(74) *Attorney, Agent, or Firm* — Law Offices of Eugene M. Cummings, P.C.

(57) ABSTRACT

A two mass, single motor bi-directional conveyor for conveying solid objects, granular and powder material. The unit utilizes the two mass sub-resonant natural frequency system driven by a single motor with counterweight wheels. The forces created by the rotation of the counterweight wheels results in a trough stroke at an angle from the horizontal pan resulting in material motion. The trough stroke is absorbed with isolation springs mounted between the conveyor and the ground.

5 Claims, 3 Drawing Sheets

SECTION X-X (LESS STAND 80)
FROM FIG. 1

SECTION A-A
FROM FIG. 2

SECTION B-B
FROM FIG. 2

SECTION C-C
FROM FIG. 2

SINGLE MOTOR TWO MASS BI-DIRECTIONAL CONVEYOR

CROSS-REFERENCE TO RELATED APPLICATION

None.

BACKGROUND OF THE INVENTION

I. Field of the Invention

The present disclosure relates to vibrating conveyors with a flat horizontal conveying pan referred to as a trough, and more particularly, to a vibratory conveyor with an angle of attack defined as an amplitude with a vertical and horizontal component design, particularly of the two mass sub-resonant natural frequency type powered by a single motor with counterweighted wheels capable of conveying in both the forward and reverse flow direction.

II. Description of the Prior Art

Bi-directional vibratory conveyors or feeders have substantial applications in a variety of fields. One typical application is in foundry operations wherein, for example, foundry castings may be delivered to a conveyor energized to feed the castings to one end or the other, depending upon where it is desired to locate the castings.

Another typical application is in the bulk operations of granular materials wherein, for example, sugar, sand, stone, flour, cement, and various other chemical compounds may be delivered to one end or the other in the same way. Additionally, the conveyors may also move combinations of these object, granular and powder materials.

A conventional bi-directional conveyor made according to the prior-art will typically include two motor and two drive arrangements that are connected to drive slats supporting the two motors and drives. The slats are set in line with the angle of attack of the two drives. The drives are angled at an angle of attack of 45° creating an angle of 90° between the two drives resulting in isolating one drive from the other through the drive slats operating at 90° from the drive angle of attack of the non-operating drive. Each motor has a pair of counterweight wheels set at a force that vibrates the pan at an amplitude that moves the material at the desired rate.

This prior-art conveyor poses a number of problems, the greatest of which is the use of two separate drive assemblies whose operation is essentially a brute force system. In other words, the operating drive mass becomes a part of the trough mass and the non-operating drive mass becomes isolated from the operating system. This creates a problem for the non-operating motor. The non-operating motor bearings are subject to a percentage of the dynamic load transmitted through the isolation slats. This dynamic load creates "false brinnelling" which causes flattened surfaces on the bearing races and motor shaft. The result being faster than normal wear.

In other examples of bi-directional conveyors, Musschoot U.S. Pat. No. 3,068,996, issued Dec. 18, 1962, proposes a system that uses air bags as reactor springs set in a two mass system using two separate drives for the purpose of conveying material in opposite directions. When one drive is activated, the second drive air bag reactor springs are deflated so that the pressure sets the air bag spring rate for the second drive at an isolation rate while the inactive drive motor remains running for the purpose of eliminating false brinnelling in said motor. Besides this invention requiring two separate motors, both motors must be continuously run while the conveyor is in operation requiring double the power needed to accomplish the task.

Schrader, U.S. Pat. No. 3,746,149, issued Jul. 17, 1973, and entitled "Reversible Vibratory Feeder", proposes a system that uses air bags as reactor springs set in a single mass system. However, the counterweight wheels needed to accomplish a reasonable stroke is about five times greater than what is needed in a two mass system. As a result, the motor horsepower required is much greater than the power required in a two mass system.

Thomson, U.S. Pat. No. 5,934,446, issued Aug. 10, 1998 uses a quick return flat (zero degree angle of attack) stroke. A forward momentum of the material is created by imposing an input of momentum for a set time. On the return flat stroke, the time input is less than the time input of the forward flat stroke. The result being a forward momentum greater than the reverse momentum creating a forward material flow. By reversing motor rotation, material flow is reversed. This system requires only one motor and only one drive assembly. However, the rate of material travel is greatly restricted for the equivalent stroke of the other inventions with a greater than zero degree angle of attack.

Similarly, the Musschoot U.S. Pat. No. 6,029,796, issued Feb. 29, 2000, uses a flattened elliptical stroke that generates a forward momentum to the material on the upward stroke of the flattened ellipse by creating a plus g-force and a slightly lesser g-force on the return stroke which subtracts from the momentum of the material travel speed. Although this arrangement creates a bi-directional material travel flow by reversing motor rotation, the travel speed of the material is greatly limited because of the relatively small difference of momentum created by the forward and reverse vertical stroke.

These prior art systems illustrate the advantage a two mass or a single mass sub-resonant natural frequency conveyor wherein the motor counterweighted wheels are considerably smaller than the counterweighted wheels on the brute force prior-art conveyor required to generate the same amplitude. Such a design would result in less torque required to rotate the smaller wheels which equates to a smaller horsepower motor.

There remains no system that is truly a bi-directional, two-mass, single motor design and at an angle of attack greater than zero degrees. Accordingly, there exists a need for such a system to provide a bi-directional conveyor to operate at a reduced power requirement.

It is a general object of this disclosure to provide an improved conveyor which utilizes less and smaller component parts, as compared to current practice, thereby greatly reducing manufacture and maintenance costs.

It is another general object of this disclosure to provide a bi-directional conveyor that will drive material more efficiently because of a set angle of attack greater than zero degrees.

It is more specific object of this disclosure to provide a bi-directional conveyor that is isolated from the ground.

These and other objects, features and advantages of this disclosure will be clearly understood through a consideration of the following detailed description.

SUMMARY OF THE INVENTION

According to an embodiment of the present disclosure, there is provided a bi-directional vibratory conveyor having a conveying surface supported by a frame support, and a second frame having a motor that drives counterweighted wheels and creates a force, one or more adjustably inflatable air bags are positioned adjacent each side of the motor and connect the frame supports whereby when one side is inflated and the other side is deflated the force created by the motor moves material along the conveying surface from the inflated to the deflated side.

BRIEF DESCRIPTION OF THE DRAWINGS

The present disclosure will be more fully understood by reference to the following detailed description of one or more preferred embodiments when read in conjunction with the accompanying drawings, in which like reference characters refer to like parts throughout the views and in which.

DESCRIPTION OF THE PREFERRED EMBODIMENTS

Figure 1:
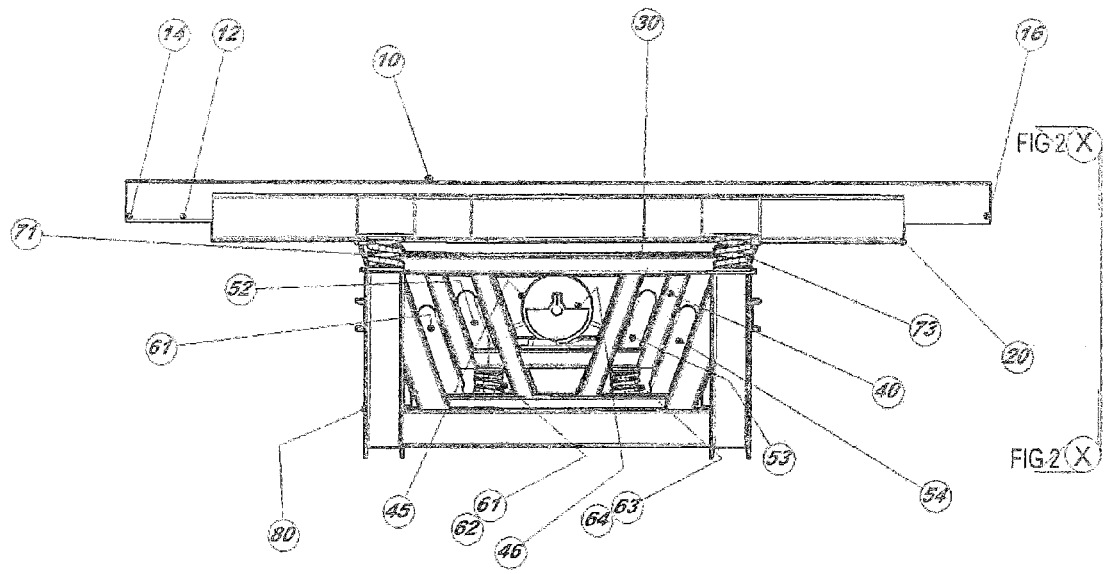
FIG. 1 is a side view of the conveyor according to the principles of the present disclosure which shows the trough, upper trough frame, lower trough frame, exciter frame with motor and counterweight wheels, reactor spring air bags, and a static support frame.

The following description of the preferred embodiments is merely exemplary in nature and is in no way intended to limit the disclosure, its application or use. These exemplars are merely used to better describe the true spirit and scope of the present disclosure.

An exemplary embodiment of a bi-directional conveyor or feeder is illustrated in the drawings and will be described herein as a conveyor, it is understood that the terms conveyor and feeder are synonymous for purposes of the present application.

Referring now to the drawings, and particularly to FIG. 1, a conveyor trough (10), having a conveying surface (12) and two ends (14, 16), is supported on the upper trough frame (20). The lower trough frame (30) is bolted to the upper trough frame (20). The exciter frame (40) floats inside the lower trough frame (30) and is supported by exciter isolation springs (61-64).

The two pairs of adjustably inflatable reactor spring air bags (51, 52) and (53, 54) are sandwiched between the lower trough frame (30) and the exciter frame (40). This arrangement adds the spring rates of the two reactor spring air bags (51, 52) or (53, 54) depending on the chosen direction of flow. The motor (45) is bolted to the exciter frame (40).

In operation, the motor (45) is powered up and reactor spring air bags (51, 52) are inflated to a specified pressure setting (approximately 5 to 15% above the sub-resonant two mass natural frequency) and reactor spring air bags (53, 54) are deflated. This creates a line of action formed by the center of gravity of the trough assembly (10, 20, 30) coupled with reactor spring air bags (51, 52). This line of action is at an angle (angle of attack) to the horizontal trough pan that thrusts the trough assembly (10, 20, 30) horizontally and vertically resulting in material being lifted and moved forward to the right direction. Conversely, by deflating reactor spring air bags (51, 52) and inflating reactor spring air bags (53, 54), the center of gravity of the trough assembly (10, 20, 30) coupled with reactor spring air bags (53, 54) form a line of action at an angle (angle of attack) that is equal and opposite of the previous arrangement also set at a sub-resonant two mass natural frequency system and the material travel reversed and to the left direction.

The entire conveyor is supported with four springs (71-74) that supports and isolates the vibration of the conveyor from the support steel (80) that is anchored to the ground.

Figure 2:
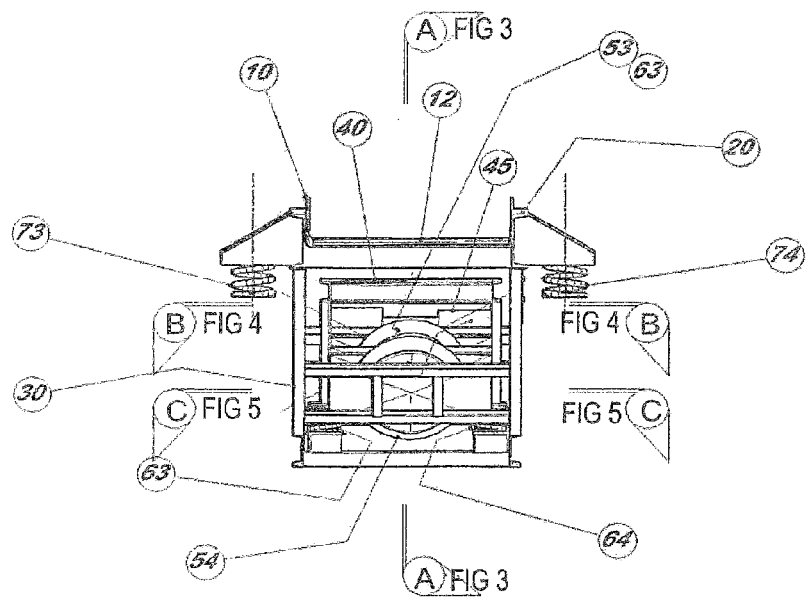
FIG. 2 is an end view of FIG. 1 consisting of the trough, upper trough frame, lower trough frame, exciter frame, and reactor spring air bags.

In FIG. 2 the lower trough frame (30) and the exciter frame (40) are shown in an end view of the subject embodiment. Also shown are the sets of reactor spring air bags (53, 54) and the motor (45).

Figure 3:
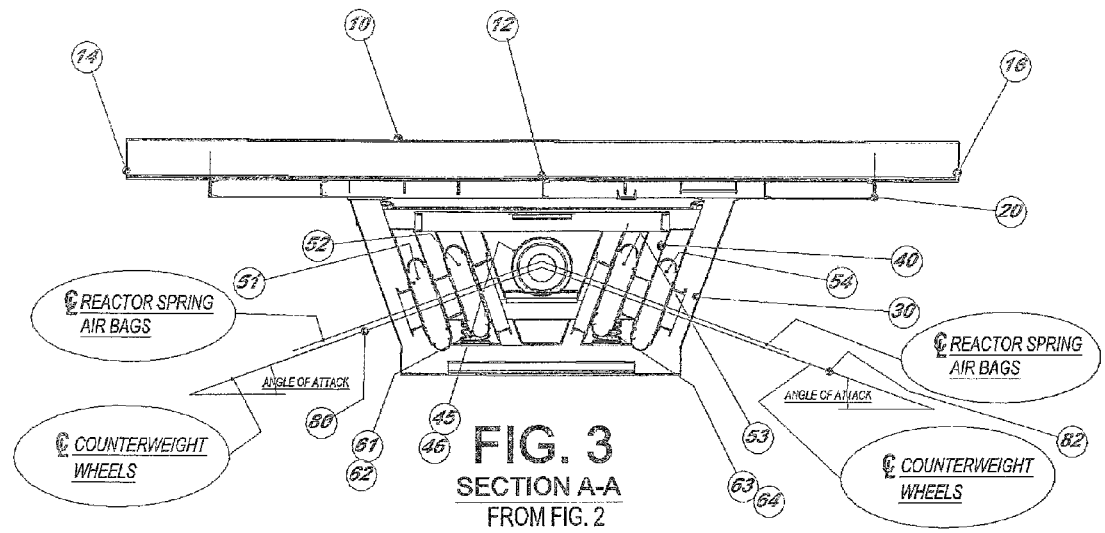
FIG. 3 is a cross-sectional view taken along line A-A of FIG. 2 and shows the trough, trough upper frame, trough lower frame and exciter frame with motor, reactor spring air bags, and exciter isolation springs.

FIG. 3 shows SECTION A-A taken from FIG. 2 in order to show more clearly the exciter frame (40) supported by the exciter isolation springs (61 thru 64). Also, the line drawn from the transverse center of the motor shaft (45) and center of the reactor spring air bags (51, 52) is a line of action that is angled from the horizontal trough pan (10) center line defined as the "angle of attack" (80). The sum of the moments of the center line of the reactor spring air bags (51, 52) multiplied by the distance to the angle of attack line and added to the moment of the combined center line of the exciter isolation springs (61-64) multiplied by the distance to the angle of attack line. This clarifies that the combined moment of the reactor spring air bags (51, 52) and the exciter isolation springs (61 thru 64) drive through the transverse center of the motor shaft (45). Conversely, for the combined center angles of attack of the reactor spring air bags (53, 54) and exciter isolation springs (61-64) drives through the reverse transverse center of the motor shaft (45) at the symmetric angle of attack (82).

Figure 4:
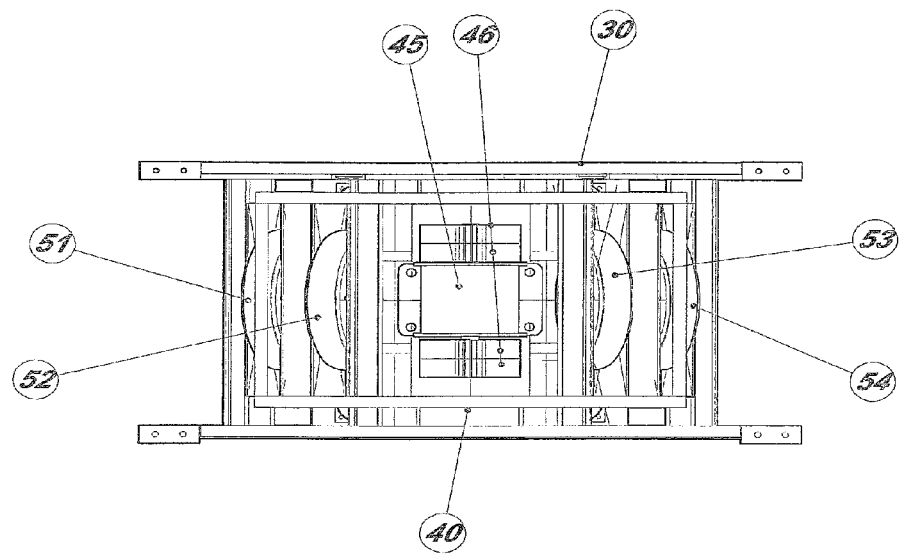
FIG. 4 is a top view of FIG. 1, without the trough, showing the lower trough frame, exciter frame floating inside the lower trough frame.

The lower trough frame (30), exciter frame (40) and motor (45) with the counterweight wheels (46) are shown in FIG. 4. This clarifies how the exciter frame assembly (40, 45, 46) floats independently from the trough frame assembly (10, 20, 30) supported by the reactor spring air bags (51, 52) and (53, 54) plus the exciter isolation springs (61 thru 64).

Figure 5:
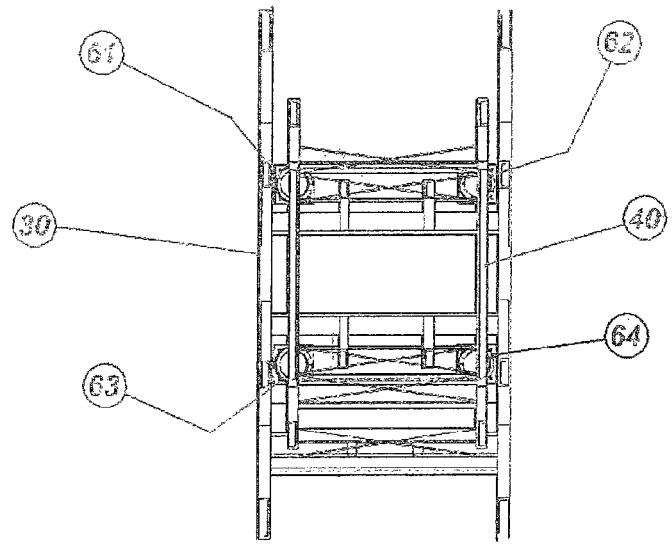
FIG. 5 is a cross-sectional view taken along line B-B of FIG. 2 and shows the trough lower frame, and exciter frame, four exciter isolation springs, reactor spring air bags and motor with counterweight wheels.

FIG. 5 shows a top section view for the purpose of clarifying how the 4 exciter isolation springs (61 thru 64) mounted on the lower trough frame (30) and supporting the exciter frame assembly (40, 45, 46).

Figure 6:
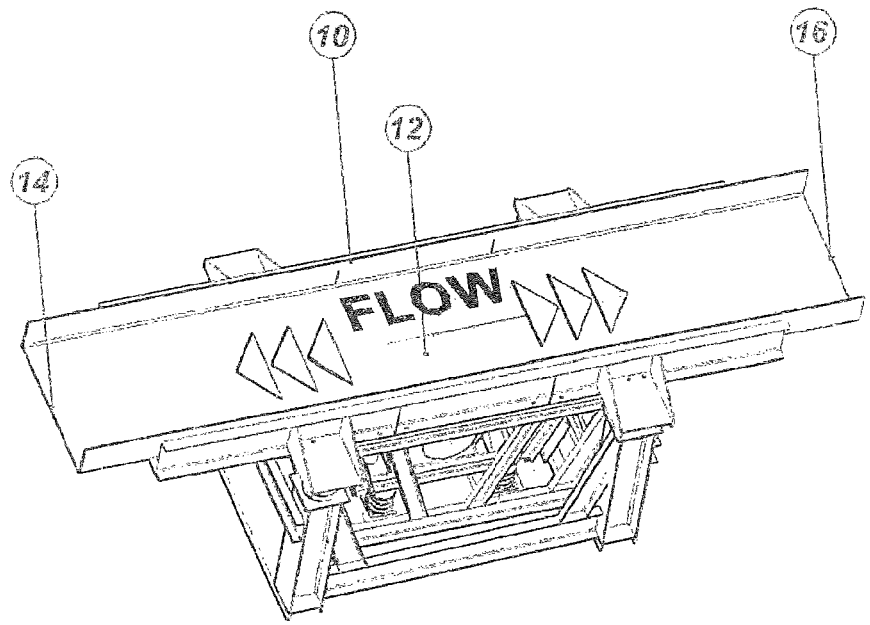
FIG. 6 is an isometric top view of FIG. 1 and shows the subject embodiment assembly further illustrating the bi-directional flow.

In FIG. 6 the entire assembly is shown in an overhead view to clarify both directions of flow to (14) and (16) on horizontal trough pan (12).

The bi-directional vibratory conveyor having a trough supported by a trough frame with an upper conveying surface for transferring energy at an angle of attack to convey material along the surface has been shown and described. The drive assembly consists of a separate second mass frame defined as an exciter frame and is connected to the trough frame mass with sets of inflatable air bags that are acting reactor springs and are set at an angle known as the angle of attack. A motor is bolted to the exciter frame that drives counterweighted wheels. The inflatable air bags are inflated to a pressure that sets the spring rate to a natural frequency of the combined masses of the trough and frame plus the exciter frame at about seven percent above the motor running speed and drives the trough at the set angle of attack. The advantage of the present invention being a two mass sub-resonant design greatly reduces the size of the counterweight wheels by about 20% of the required counterweight wheels needed to accomplish the same stroke in a standard single mass system. This results in the required motor horsepower size being considerably smaller that reduces the cost of the machine operation. By deflating the one set of air bags and inflating the other set of air bags reverses the direction of material travel.

The foregoing detailed description has been given for clearness of understanding only and no unnecessary limitations should be understood therefrom. Accordingly, while one or more particular embodiments of the disclosure have been shown and described, it will be apparent to those skilled in the art that changes and modifications may be made therein without departing from the invention if its broader aspects, and, therefore, the aim in the appended claims is to cover all such changes and modifications as fall within the true spirit and scope of the present disclosure.

What is claimed is:

1. A bi-directional vibratory conveyor, comprising:
   a generally horizontal, elongated conveying surface;
   a first frame supporting said conveying surface;
   a second frame having a motor that drives counterweighted wheels and creates a force; and
   one or more adjustably inflatable air bags on adjacent sides of said motor connecting said first frame and said second frame whereby when one side is inflated and the other side is deflated said force moves material along said conveying surface from the inflated side to the deflated side.

2. A bi-directional conveyor as defined in claim 1 whereby said motor including shaft and counterweight axis are on the centers of gravity of said first and second frames.

3. The bi-directional conveyor as defined in claim 1 wherein said air bags are in a parallel construction that results in the summation of the spring rate creating a natural frequency about 5 to 15% above running speed of said motor for each of the said reactor spring air bags.

4. The bi-directional conveyor as defined in claim 1 where by each set of reactor spring air bags are inflated independently while the other set of reactor spring air bags are deflated.

5. A bi-directional vibratory conveyor as defined in claim 1 wherein said air bags are positioned on equal and opposite sides of a center of gravity of said second frame and said first frame at an angle so that the two sets of said air bags are driven at an angle of attack and are symmetrical about the centers of gravity of said frames.

* * * * *